United States Patent [19]
Sakakibara et al.

[11] Patent Number: 4,605,260
[45] Date of Patent: Aug. 12, 1986

[54] VEHICLE DOOR STRUCTURE

[75] Inventors: Yozo Sakakibara, Aichi; Yuji Okamoto, Toyota, both of Japan

[73] Assignee: Toyota Jidosha Kabushiki Kaisha, Japan

[21] Appl. No.: 692,182

[22] Filed: Jan. 17, 1985

[30] Foreign Application Priority Data

Feb. 7, 1984 [JP] Japan ............................ 59-16232[U]

[51] Int. Cl.$^4$ ................................................ B60J 5/04
[52] U.S. Cl. ................................... 296/201; 296/146; 49/374; 49/502
[58] Field of Search ........................ 296/146, 152, 201; 49/502, 374, 375, 348; 248/475.1

[56] References Cited

U.S. PATENT DOCUMENTS

| | | | |
|---|---|---|---|
| 2,764,928 | 10/1956 | Martinson | 98/2 |
| 4,432,167 | 2/1984 | Watanuki | 49/502 |
| 4,457,111 | 7/1984 | Koike | 296/146 |

FOREIGN PATENT DOCUMENTS

| | | |
|---|---|---|
| 0040168 | 11/1981 | European Pat. Off. . |
| 847506 | 10/1939 | France . |
| 1250976 | 4/1961 | France . |
| 2101832 | 3/1972 | France . |
| 55-165824 | 5/1980 | Japan . |
| 56-148924 | 4/1981 | Japan . |
| 57-29444 | 7/1982 | Japan . |
| 58-103937 | 7/1983 | Japan . |
| 169877 | 3/1921 | United Kingdom . |

OTHER PUBLICATIONS

Patents Abstracts of Japan, vol. 2, No. 107, Sep. 6, 1978, (53 73 726).
Patents Abstracts of Japan, vol. 7, No. 71, Mar. 24, 1983, (58 415).
Patents Abstracts of Japan, vol. 7, No. 71, Mar. 24, 1983, (58 414).
Patents Abstracts of Japan, vol. 7, No. 79, Mar. 31, 1983, (58 4623).
Patents Abstracts of Japan, vol. 8, No. 207, Sep. 21, 1984, (59 96 013).

Primary Examiner—Robert R. Song
Attorney, Agent, or Firm—Parkhurst & Oliff

[57] ABSTRACT

A vehicle door structure having a door frame on which a door side rear view mirror is mounted by a bracket. The bracket is secured onto both the door side rear view mirror and the door frame. The portion where the bracket is secured onto the door frame, comprises two part. The first part of the bracket is such a part as a fastener is provided to secure the bracket onto the door frame. The second part of the bracket is such a part as the fastener is not provided. The length of the second part of the bracket in the lateral direction of the vehicle is designed to be less than that of the first part.

8 Claims, 6 Drawing Figures

VEHICLE DOOR STRUCTURE

BACKGROUND OF THE INVENTION

The present invention relats to a vehicle door structure having a door frame equipped with a door side rear view mirror which is mounted on a bracket, and more particularly to a door frame equipped with a door side rear view mirror mounted on a bracket which is located in a plane almost the same as that of a door window and whose thickness is reduced as much as possible.

Referring to FIG. 1, a door frame 10 is fixed on a door 2. A door window 4 is mounted within the door 2 so that the door window 4 can be moved upwardly and downwardly by a passenger. A door side rear view mirror 6 is fastened onto a front portion of the door frame 10 by a bracket 8. A guide rail 9 is fixed to the bracket 8 at the upper portion of the guide rail 9 and the guide rail 9 is further fixed to the door 2 by screws 90. The guide rail 9 has a guide groove therein which the peripheral portion of the door window 4 contacts during the upward and downward movement of the door window 4.

FIG. 6 shows a prior door frame equipped with a door side rear view mirror (not shown in FIG. 6) which is mounted on the bracket 8. The bracket 8 has a projecting portion 80 which protrudes toward the door frame 10. The projecting portion 80 has a hole 82 at approximately a central portion thereof through which a screw extends and is fastened to the door frame 10. According to the prior art vehicle door structure, the distance $L_6$ in the projecting portion 80, as shown in FIG. 6, must be maintained to be sufficient for providing a plurality of burring holes 82 therein.

To enhance the aesthetic view and the aerodynamics of a vehicle body, it is required to shorten the length of the door frame 10 in the lateral direction of the vehicle. However, when the length of the door frame 10 in the lateral direction of the vehicle is shortened in the prior art door frame, the distance $L_6$ between the projecting portions is insufficient for providing a plurality of burring holes 82 therein.

SUMMARY OF THE INVENTION

The present invention was made in view of the foregoing background and to overcome the foregoing drawbacks. It is accordingly an object of this invention to provide a vehicle door structure having a door frame on which a compact door mirror bracket is mounted.

To attain the above objects, a vehicle door structure according to the present invention has a door frame in which a door window is provided. A door side rear view mirror is secured onto the door frame. A bracket is provided between the door frame and the door side rear view mirror. The bracket is secured onto both the door frame and the door side rear view mirror. The bracket has a portion on which there is provided a fastener for securing the bracket onto the door frame. The portion of the bracket where the fastener is not provided is designed to have a shorter length than that at the position where the fastener is provided.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
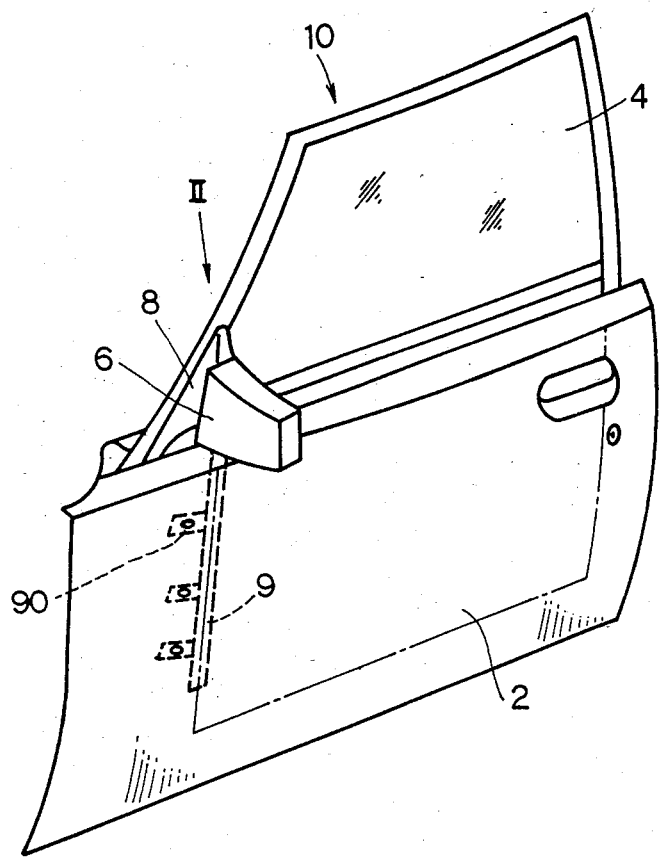
FIG. 1 is a perspective view of a vehicle door equipped with a door side rear view mirror.

As shown in FIG. 1, a door frame 10 is fixed on a door 2. A door window 4 is mounted within the door 2 so that the door window 4 is upwardly and downwardly movable by a passenger. A door side rear view mirror 6 is fastened onto a front portion of the door frame 10 through a bracket 8. A guide rail 9 is fixed to the bracket 8 at its upper portion and further fixed to the door 2 by screws 90. The guide rail 9 has a guide groove therein which the peripheral portion of the door window 4 contacts during the upward and downward movement of the door window 4.

Figure 2:
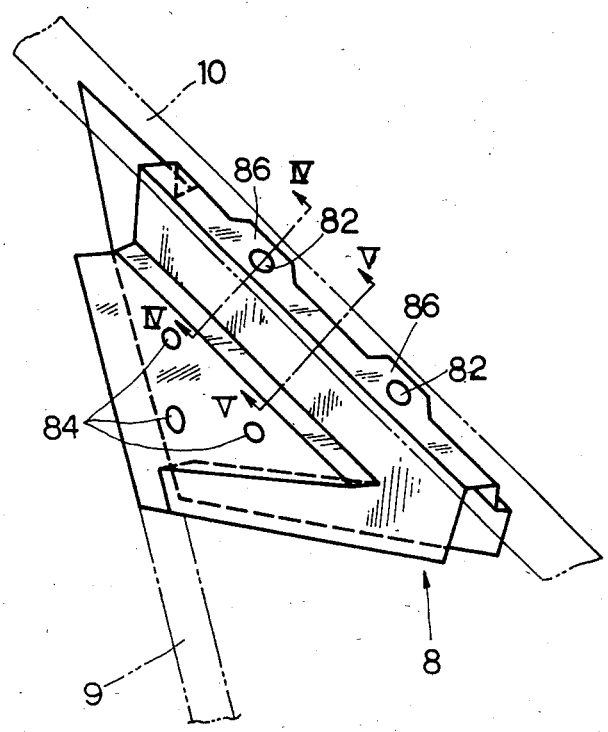
FIG. 2 is a perspective view of a bracket on which a door side rear view mirror is mounted, as viewed from the direction indicated by the reference II in FIG. 1.
Figure 4:
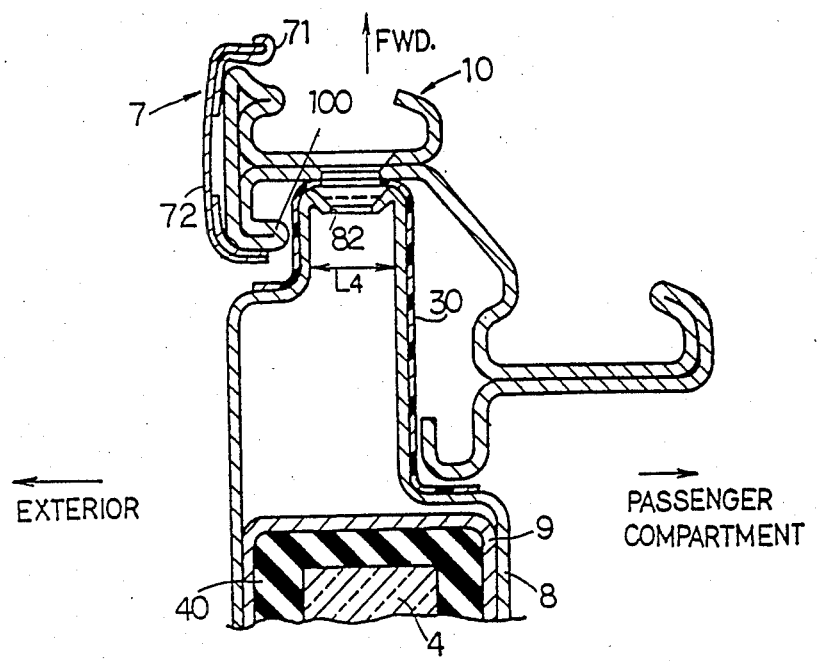
FIG. 4 is a cross-sectional view taken along the line IV—IV in FIG. 2.
Figure 5:
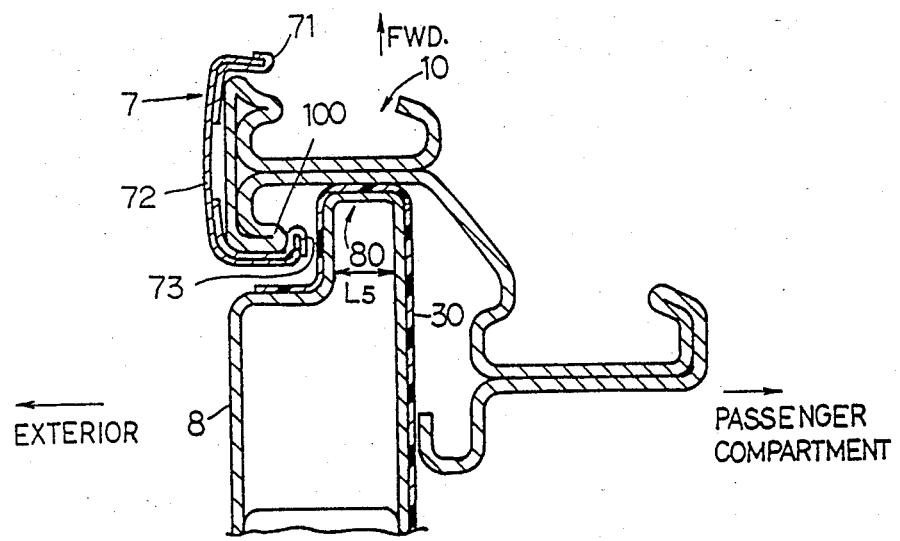
FIG. 5 is a cross-sectional view taken along the line V—V in FIG. 2.
Figure 6:
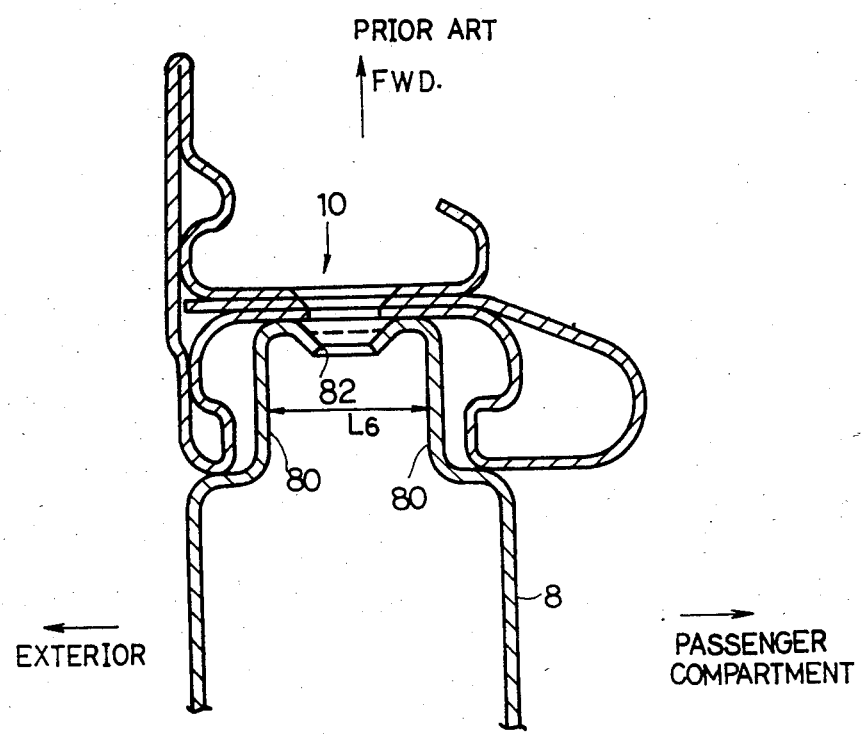
FIG. 6 is a cross-sectional view of a prior door frame equipped with a bracket on which a door side rear view mirror is mounted, corresponding to FIG. 4.

FIG. 2 illustrates the bracket 8 as viewed from the direction indicated by the reference II in FIG. 1. FIG. 4 illustrates the cross-sectional view taken along the line IV—IV in FIG. 2. FIG. 5 illustrates the cross-sectional view taken along the line V—V in FIG. 2.

As shown in FIG. 2, the bracket 8 is fastened onto a front corner portion of the door frame 10 by screws which are inserted into burring holes 82 defined in the bracket 8 to engage with nuts (not shown in the drawings) which are located opposite to the screws. Further, other holes 84 are provided in the bracket 8. The door side rear view mirror 6 has projections which fit into the holes 84. The projections of the mirror 6 are engaged with nuts to be fixed onto the bracket 8.

As shown in FIGS. 4 and 5, a protector 30, which consists of a polyvinyl chloride, is adhered by adhesives onto a part of the bracket 8. The holes 82 are provided with a prescribed distance as shown in FIG. 2. The distance $L_4$ of the bracket 8 at the position where the hole 82 is provided is designed to be longer than the distance $L_5$ of the bracket 8 at the position where the hole 82 is not provided.

As shown in FIG. 2, a guide rail 9 is fitted into the inside of the left end of the bracket 8. This guide rail 9 is fastened onto the door 2 by screws 90 as shown in FIG. 1.

Figure 3:
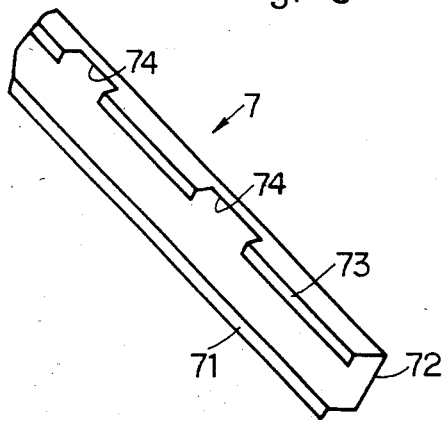
FIG. 3 is a perspective partial view of a door frame moulding which is fitted on a door frame.

FIG. 3 shows a perspective partial view of a door frame moulding 7. The door frame moulding 7 is fitted onto an exterior surface of the door frame 10 as shown in FIGS. 4 and 5. The door frame moulding 7 comprises a first flange portion 71, an exterior surface portion 72, and a second flange portion 73. The second flange portion 73 has notches 74 at the position corresponding to extended portions 86 of the bracket 8 which are provided around the holes 82, as shown in FIG. 2.

The door frame moulding 7 as fitted onto the door frame 10, is shown in FIGS. 4 and 5. As shown in FIG. 4, the door frame moulding 7 does not extend onto an end portion 100 of the door frame 10 because there is provided the notch 74, at the position where the hole 82 is provided. On the other hand, as shown in FIG. 5, the door frame moulding 7 extends onto the end portion 100 of the door frame 10, at the position where the hole 82 is not provided.

The numeral 40 shown in FIG. 4 designates a cushioning member provided between the guide rail 9 and the door window 4.

Thus, the bracket 8 has extended portions 86 only at the positions where the holes 82 are provided, thereby enabling burring holes to be provided therein. Hence, the bracket 8 can be compact in the lateral direction of the vehicle.

While the present invention has been described in its preferred embodiments, it is to be understood that the invention is not limited thereto, and may be otherwise embodied within the scope of the following claims.

What is claimed is:

1. A vehicle door structure, comprising:
   a door frame having a door window opening therein, said door frame defining upper, front and rear borders of said door window opening, said door frame including an exterior portion and an interior portion, said door frame being mounted on a door plate, said door plate defining a lower border of the door window opening, said door frame incluidng a front portion and a rear portion;
   a bracket provided between said front portion of said door frame and said door plate, the bracket being secured onto the door frame, the bracket having a first insert portion where the bracket is fixed by a fixing means onto the door frame and a second insert portion, the first insert portion having a length in the lateral direction of the vehicle which is greater than the length of the second insert portion, said bracket having an exterior surface and an interior surface, said exterior surface cooperating with the exterior portion of the door frame to create a substantially flush exterior surface, said interior surface including said first and second insert portions, said second insert portion being spaced from said door frame by a predetermined distance;
   a door frame molding attached to the exterior surface of the door frame, said door frame molding including a notch portion and a hook portion, said notch portion being located at the first insert portion of the bracket, said hook portion being located at the second insert portion of said bracket and being inserted into said predetermined distance defined between said second insert portion and said door frame; and
   a rear view mirror secured to said door frame, whereby the door frame molding is securely mounted on the door frame by the hook portion of the door frame molding.

2. The vehicle door structure of claim 1, wherein the vehicle door structure further comprises a guide rail in which a door window is slidably moved, said guide rail being fixed to the door.

3. The vehicle door structure of claim 1, wherein a protector is adhered onto said bracket, said bracket being secured to the door frame through the protector.

4. The vehicle door structure of claim 3, wherein the protector is comprised of synthetic resins.

5. The vehicle door structure of claim 4, wherein the protector is comprised of polyvinyl chloride.

6. The vehicle door structure of claim 1, wherein the fixing means comprises a screw and a nut.

7. The vehicle door structure of claim 1, wherein the bracket has an opening through which a screw extends, and the bracket is fixed to said rear view mirror.

8. The vehicle door structure of claim 7, wherein the opening is a burring hole.

* * * * *